(12) United States Patent
Wang et al.

(10) Patent No.: US 7,668,794 B2
(45) Date of Patent: Feb. 23, 2010

(54) METHOD AND APPARATUS FOR COMPLEX RFID EVENT PROCESSING

(75) Inventors: Fusheng Wang, Plainsboro, NJ (US);
Shaorong Liu, Los Angeles, CA (US);
Peiya Liu, East Brunswick, NJ (US)

(73) Assignee: Siemens Corporation, Iselin, NJ (US)

( * ) Notice: Subject to any disclaimer, the term of this patent is extended or adjusted under 35 U.S.C. 154(b) by 567 days.

(21) Appl. No.: 11/538,854

(22) Filed: Oct. 5, 2006

(65) Prior Publication Data

US 2007/0208680 A1    Sep. 6, 2007

Related U.S. Application Data

(60) Provisional application No. 60/723,882, filed on Oct. 5, 2005.

(51) Int. Cl.
*G06N 5/02* (2006.01)

(52) U.S. Cl. .............................. 706/47; 706/20; 726/5; 455/342

(58) Field of Classification Search .................. 706/20, 706/47; 713/201; 340/572.1; 726/5
See application file for complete search history.

(56) References Cited

U.S. PATENT DOCUMENTS

| | | | |
|---|---|---|---|
| 7,245,220 B2 * | 7/2007 | Haller et al. | 340/572.1 |
| 2005/0193222 A1 * | 9/2005 | Greene | 713/201 |
| 2006/0184473 A1 * | 8/2006 | Eder | 706/20 |

\* cited by examiner

*Primary Examiner*—David R Vincent
*Assistant Examiner*—Ola Olude-Afolabi

(57) ABSTRACT

An RFID events processing system includes a rules database having filtering rules and complex event rules, a primitive event filtering unit for receiving a plurality of primitive events to generate filtered events based on the filtering rules, and a complex event detection engine which receives the filtered events and detects complex events based on the complex event rules.

12 Claims, 13 Drawing Sheets

```
CREATE RULE rule_id, rule_name
ON event
IF condition
DO
        action 1; action 2; ...; action n
```

FIG. 5a

```
DEFINE E1 = OBSERVATION("R", O, T1)
DEFINE E2 = OBSERVATION("R", O, T2)
CREATE RULE R1, DUPLICATE_DETECTION_RULE
ON WITHIN(E1 ∧ E2, 5s)
IF true
DO
        send_duplicate_msg(E1)
```

FIG. 5b

```
DEFINE E1 = OBSERVATION("R", O, T1)
DEFINE E2 = OBSERVATION("R", O, T2)
CREATE RULE R2, REMOVED_ITEM_RULE
ON WITHIN(E1 ∧ ¬E2, 30s)
IF true
DO
        INSERT INTO OBSERVATION
        VALUES(R, O, T1)
```

FIG. 5c

```
DEFINE E1 = OBSERVATION("R". O, T)
CREATE RULE R3, LOCATION_CHANGE_RULE
ON E1
IF true
DO
        update_location(R,O,T)
```

FIG. 5d

```
DEFINE E1 = OBSERVATION("R1", O1, T1)
DEFINE E2 = OBSERVATION("R2", O2, T2)
CREATE RULE R4, CONTAINMENT_RULE
ON TSEQ( TSEQ⁺(E1, 0.1s, 0.1s); E2, 10s, 20s)
IF true
DO
        INSERT INTO CONTAINMENT
        VALUES (O2,O1,T2,"UC")
```

FIG. 5e

```
DEFINE E4 = OBSERVATION("R4", O4, T4)
DEFINE E5 = OBSERVATION("R4", O5, T5)
CREATE RULE R5, ASST_MONITORING_RULE
ON WITHIN(E4 ∧ ¬E5, 5s)
IF true
DO
        send_alarm()
```

FIG. 5f

RFID_COMPOSITE_EVENT_DETECTION(R={$r_1, r_2, ..., r_n$}).
1   Construct an event graph G representing the rules in R (Section 6.3)
2   //*begin of initializing event graph*
3   Propagating interval constraints starting from the root node of G
4   Assigning an event detection mode for each node in G
5   Assigning pseudo event flag and target for each node in G
6   //*end of initializing event graph*
7   for each incoming event $e_1$
8       do if $e_1$ is an instance of a primitive event $E_1$
9           then for each parent node, $v_E$, of $v_{E_1}$
10              do ACTIVATE_PARENT_NODE( $v_E, e_1$ )
11                  if $v_{E_1}$ pseudo
12                      then GENERATE_PSEUDO_EVENT($v_{E_1}, v_E, e_1$ )
13              for each rule r whose event part is represented by $v_{E_1}$
14                  do trigger the rule r
15          if $e_1$ is a pseudo event
16              then let E be the target event of $e_1$
17                  let tstart be the creation timestamp of $e_1$
18                  let tend be the execution timestamp of $e_1$
19                  EList ← QUERY_INTERVAL_NODE($v_E$, tstart, tend)
20                  for each event instance e in EList
21                      do for each parent node, v, of $v_E$
22                          do ACTIVATE_PARENT_NODE(v, e)

FIG. 7

```
PROPAGATE_INTERVAL_CONSTRAINT(v_E)
    1   //v_E is a node representing an event E in an event tree T_i
    2   let v'_E be the parent node of v_E in T_i
    3   if ( v'_E =NIL) || ( v'_E · within = NIL)
    4     then if there is an interval-constraint on E
    5            then v_E · within ← E's interval-constraint
    6            else v_E · within ← NIL
    7     else if there is an interval-constraint on E
    8            then v_E · within ← min{E's interval-constraint, v'_E · within}
    9            else v_E · within ← v'_E · within
    10  let v_{E1},...,v_{Em} be the set of nodes that are child nodes of v_E in T
    11  for i ← 1 to m
    12    do PROPAGATE_INTERVAL_CONSTRAINT(v_{Ei})
```

FIG. 9

```
ASSIGN_PSEUDO_EVENT_FLAG(v_E)
1   if v_E . mode = push
2      then return
3   switch
4    case E = E_1 ∨ E_2 :
5       if v_{E1} . mode ≠ pull
6          then ASSIGN_PSEUDO_EVENT_FLAG (v_{E_1})
7       if v_{E2} . mode ≠ pull
8          then ASSIGN_PSEUDO_EVENT_FLAG (v_{E_2})
9
10   case E = E_1 ∧ E_2 :
11      if v_{E1} . mode ≠ pull && v_{E2} . mode ≠ push
12         then v_{E_1} . pseudo ← true
13              v_{E_1} . pseudo_target ← E_2
14              ASSIGN_PSEUDO_EVENT_FLAG (v_{E_1})
15      if v_{E2} . mode ≠ pull && v_{E1} . mode ≠ push
16         then v_{E_2} . pseudo ← true
17              v_{E_1} . pseudo_target ← E_1
18              ASSIGN_PSEUDO_EVENT_FLAG (v_{E_2})
19
20   case E = E_1 ; E_2 :
21      if (v_{E1} . mode ≠ pull) && ( v_E . within ≠ NIL)
22         then v_{E_1} . pseudo ← true
23              v_{E_1} . pseudo_target ← E_2
24              ASSIGN_PSEUDO_EVENT_FLAG (v_{E_1})
25
26   case E = TSEQ(E_1 ; E_2, T_l, T_u) :
27      if v_{E1} . mode ≠ pull
28         then v_{E_1} . pseudo ← true
29              v_{E_1} . pseudo_target ← E_2
30              ASSIGN_PSEUDO_EVENT_FLAG (v_{E_1})
31
32   case E = SEQ^+ (E_1) :
33      if v_{E1} . mode ≠ pull && v_E . within ≠ NIL
34         then v_{E_1} . pseudo ← true
35              v_{E_1} . pseudo_target ← E
36              ASSIGN_PSEUDO_EVENT_FLAG (v_{E_1})
37
38   case E = TSEQ^+ (E_1, T_l, T_u ) :
39      if v_{E1} . mode ≠ pull
40         then v_{E_1} . pseudo ← true
41              v_{E_1} . pseudo_target ← E
42              ASSIGN_PSEUDO_EVENT_FLAG (v_{E_1})
```

FIG. 10

METHOD AND APPARATUS FOR COMPLEX RFID EVENT PROCESSING

CROSS-REFERENCE TO RELATED APPLICATIONS

This application claims priority to U.S. Provisional Application No. 60/723,882, filed on Oct. 5, 2005, the disclosure of which is incorporated by reference herein.

BACKGROUND OF THE INVENTION

1. Technical Field

The present disclosure relates generally to processing of radio frequency identification (RFID) events, and, more particularly, to a method and an apparatus for processing complex RFID events.

2. Discussion of the Related Art

RFID technology uses radio-frequency waves to transfer data between readers and moveable tagged objects. Thus it is possible to create a physically linked world in which every object can be numbered, identified, catalogued, and tracked. RFID is automatic and fast, and does not require line of sight or contact between readers and tagged objects With such significant technology advantages, RFID has been gradually adopted and deployed in a wide area of applications, such as access control, library checkin and checkout, document tracking, smart box, highway tolls, supply chain and logistics, security, and healthcare.

RFID technology enables the identification and tracking of physical objects though an Electronic Product Code (EPC) tag. Electronic Product Codes are part of an identification scheme for universally identifying physical objects and are defined by EPCGlobal. By tagging objects with an EPC, the identifications and behaviors of these objects can be precisely observed and tracked.

A simple RFID system is illustrated in FIG. 1. The RFID system consists of a host computer 110, an RFID reader 120, an antenna 130 (often combined with a reader), and an RFID tag 140.

The RFID tag 140 can be read-only or read-write, and the RFID tag's 140 memory can be factory or field programmed. The RFID tag 140 is uniquely identified by an EPC stored in its memory. EPCglobal classifies RFID tags into five classes as shown in Table 1. Class 0 and 1 are read-only; Class 2 tags are read-write by readers; Class 3 tags come with onboard sensors that can write data into the tags; Class 4 tags are actually wireless sensors used for sensor networks; and Class 5 tags are readers.

TABLE 1

EPC Classes of RFID tags.

| Class | Description |
|---|---|
| 0 | Read-only. Factory Programmed ID. |
| 1 | Write once read only. Factory or user programmed ID. |
| 2 | Read-write. Users can read and write to tag's memory from a writer (also a reader). |
| 3 | Read-write with onboard sensors. Sensors write measurement to tags' memory. |
| 4 | Read-write with integrated transmitters. Active tags that can communicate with other class 4 tags or readers. |
| 5 | Readers. Wireless networked readers that can communicate with each other. |

The RFID reader 120 sends energy through radio frequency (RF) signal to the RFID tag 140 for power, and the RFID tag 140 sends back a modulated signal with data with includes the EPC and possibly some additional data. The RFID reader 120 then decodes and sends the data to the host computer 110.

RFID readers can be mounted at a fixed point such as a warehouse entrance/exit or point of sale. RFID readers can be deployed at different locations and networked together, which provides an RFID-based pervasive computing environment. This is illustrated in FIG. 2, where L1-L6 denote different locations mounted with readers. Tagged objects moving in this environment will then be automatically sensed and observed with their identifications, locations and movement paths. RFID readers can also be mobile: tethered, hand-held, or wireless.

Data recovered by RFID Readers from RFID tags are also known as observations. Such observations are raw data and provide no explicit semantic meanings. They have to be transformed into semantic data properly represented with their own data models before they can be integrated into applications.

There are generally two types of RFID applications: i) history oriented object tracking and ii) real-time oriented monitoring. Both application types need to transform RFID observations into logic data. In history oriented tracking, RFID data streams are collected from multiple RFID readers at distributed locations, and transformed into semantic data stored in an RFID data store. The semantics of the data include location, aggregation, and temporal.

Location can be a geographic location or a symbolic location such as a warehouse, a shipping route, a surgery room, or a smart box. A change of location of an EPC-tagged object can be signaled by certain RFID readers. The location histories of RFID objects are then transformed automatically from these RFID readings, and stored in a location history relation in an RFID data store.

Aggregation is the formation of hierarchical relationships among objects. A common case is the containment relationship, illustrated in FIG. 3. Referring to FIG. 3, on a packing conveyer, a sequence of tagged items move through Reader A and are observed by the readers as a sequence of observations. Then a tagged case is read by Reader B as another observation. After that, all the items of this sequence are packed into a case. An aggregation relationship often implies important semantics. For example, a case with its contained items shares the same locations. Another similar concept is association, where tagged objects are associated with certain relationships. For example, a laptop may be associated with a list of authorized users; and a surgery kit may include a list of tools belonging to the kit.

RFID observations and their collected data are highly temporal-oriented. All events (e.g., observations) are associated with timestamps when the event happens. Observations can represent different semantics, including (1) location changes, (2) aggregation/association relationship changes, (3) start (or end) of operations/processes; and (4) occurrences of new events. Thus, a history oriented data model is essential to preserve the event and state-change histories, which are the key to tracking, tracing, and monitoring physical objects in a pervasive computing environment.

RFID is also widely used for real-time applications, where patterns of RFID observations implying special application logic can trigger real-time responses. For example, a company could use RFID tags to identify asset items and employees in the building, and only allow authorized users to move an asset item out of the building. When an unauthorized employee or a criminal takes a laptop with an embedded RFID tag out of the building, the system sends an alert to security personnel for response.

RFID events however, have their own characteristics and cannot be easily supported by traditional event systems. RFID events are temporally constrained Both the temporal distance between two events and the interval of a single event are critical for event detection. Such temporal constraints, however, are not well supported by traditional Event-Condition-Action (ECA) rules detection systems. In addition, non-spontaneous events, including negative events and temporal constrained events, are important for many RFID applications but difficult to support in past event detection engines. The actions from RFID events are quite different as well. They neither trigger new primitive events for the system, nor lead to a cascade of rule firings as in active databases. Thus, there is an opportunity to build a scalable rule-based system to process complex RFID events.

SUMMARY OF THE INVENTION

An exemplary embodiment of the present invention provides an RFID events processing system including a rules database having filtering rules and complex event rules, a primitive event filtering unit for receiving a plurality of primitive events to generate filtered events based on the filtering rules, and a complex event detection engine which receives the filtered events and detects complex events based on the complex event rules.

An exemplary embodiment of the present invention provides a method for processing an RFID application. The method includes the steps of mapping the RFID application into a plurality of rules and corresponding complex events, receiving primitive events as input, and outputting the primitive events to a graph-based RFID composite event detection algorithm for detection of the complex events and triggering of the corresponding rules.

An exemplary embodiment of the present invention provides a program storage device readable by machine which tangibly embodies a program of instructions executable the machine to perform instructions executable by the machine to perform a method for processing and RFID application. The method steps include mapping the RFID application into a plurality of rules and corresponding complex events, receiving primitive events as input, and outputting the primitive events to a graph-based RFID composite event detection algorithm for detection of the complex events and triggering of the corresponding rules.

An exemplary embodiment of the present invention provides a declarative event language which comprises a syntax which enables modeling of an RFID application through syntactical constructs.

These and other exemplary embodiments, aspects, features and advantages of the present invention will be described or become more apparent from the following detailed description of exemplary embodiments, which is to be read in connection with the accompanying figures.

BRIEF DESCRIPTION OF THE DRAWINGS

FIG. 5a illustrates syntax for an RFID rule according to an exemplary embodiment of the present invention.

FIGS. 5b-5f illustrates exemplary embodiments of RFID rules using the syntax of FIG. 5a.

FIG. 7 illustrates exemplary pseudo code for a graph-based RFID composite event detection algorithm, according to an exemplary embodiment of the present invention.

FIG. 9 illustrates exemplary pseudo code for the graph-based RFID composite event detection algorithm, according to an exemplary embodiment of the present invention.

FIG. 10 illustrates exemplary pseudo code for the graph-based RFID composite event detection algorithm, according to an exemplary embodiment of the present invention

DETAILED DESCRIPTION OF EXEMPLARY EMBODIMENTS

In general, exemplary embodiments of the invention as described in further detail hereafter include systems and methods for processing complex RFID events in RFID applications. A declarative rules based approach is developed to provide support of automatic RFID data transformation between the physical world and the virtual world. A graph-based RFID composite event detection algorithm is developed which supports temporal constraints in event detection. Pseudo events are also introduced in event detection to process non-spontaneous events, which are difficult to process in traditional event detection systems. Once the events are processed, they may be stored using a generic RFID data model.

Exemplary systems and methods for processing complex RFID events in RFID-based tracking and monitoring applications will now be discussed in further detail with reference to illustrative embodiments of FIGS. 4-12. It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
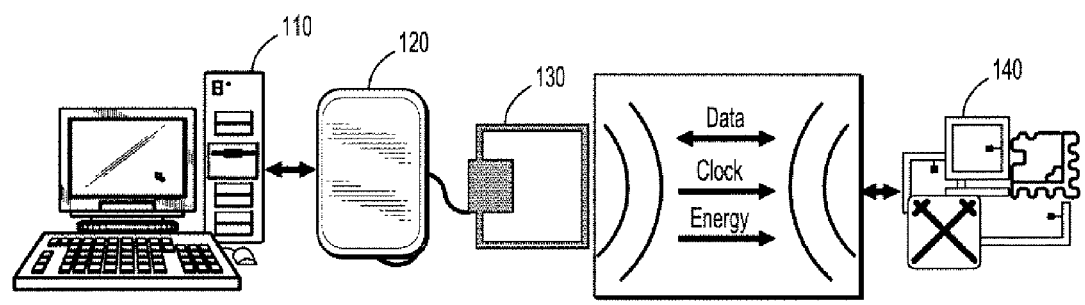
FIG. 1 illustrates a simple RFID system.
Figure 2:
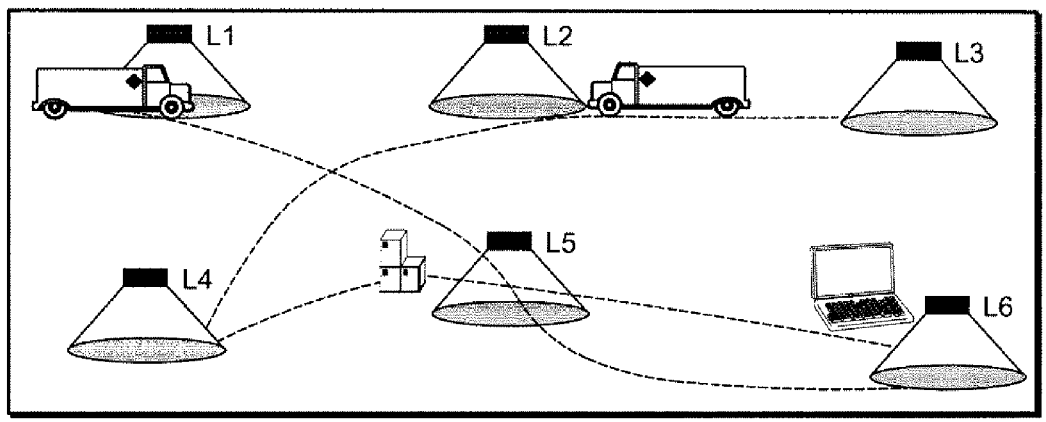
FIG. 2 illustrates an RFID-based pervasive computing environment.
Figure 3:
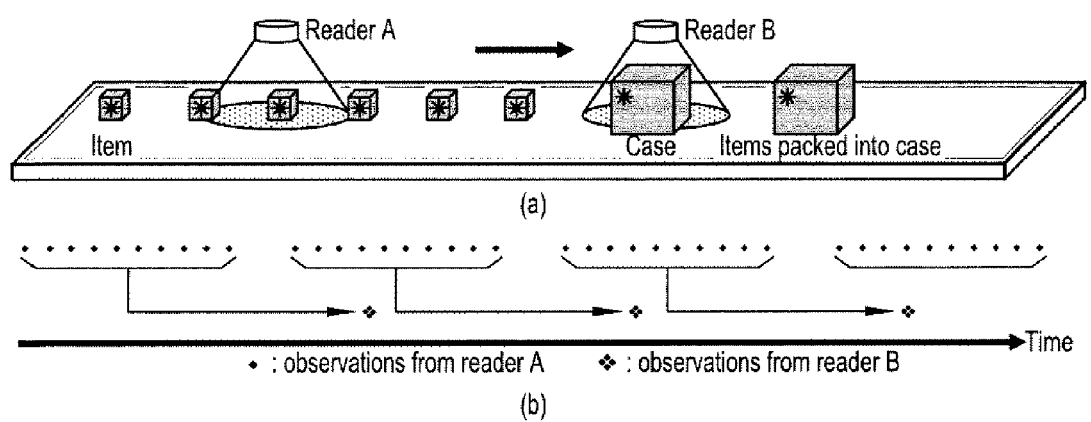
FIG. 3 illustrates an example of aggregation in RFID.
Figure 4:
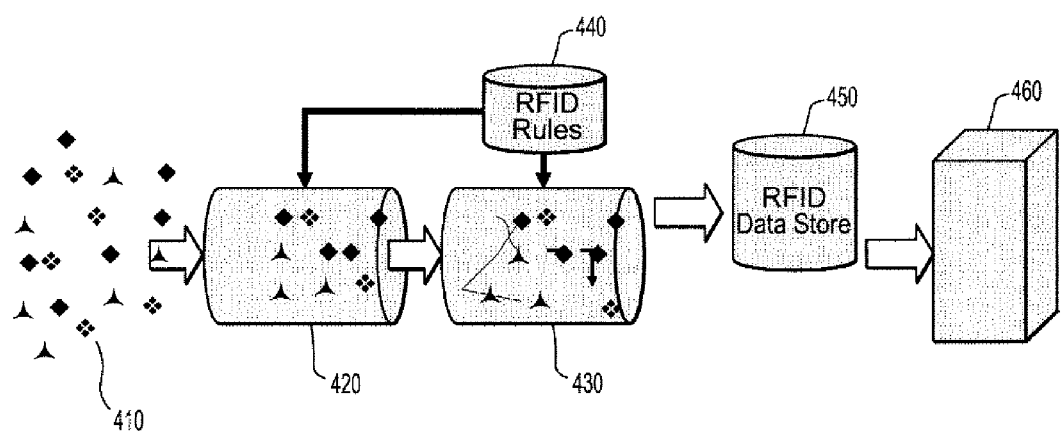
FIG. 4 illustrates an RFID event processing system according to an exemplary embodiment of the invention.

FIG. 4 is a high-level block diagram of RFID events processing system, according to an exemplary embodiment of the present invention. Referring to FIG. 4, primitive events (observations) 410 are passed to a event filtering unit 420. The event filtering unit 420 generates filtered events by using filtering rules from the RFID rules database 440 on the received primitive events. The filtered events are passed to the Complex Event Detection Engine 430 for detection of complex events. A complex event may be made up of two primitive events joined by an event constructor. As an example, 'it is raining' and 'I have an umbrella' are two primitive events joined by a logical AND event constructor. A complex event may also be made up of multiple complex events and event constructors. The Complex Event Detection Engine 430 detects a complex events based on event rules stored in the RFID rules database 440. Once the engine detects a complex event, the complex event can then be stored in the RFID data store 450. The RFID data store 450 can then send the detected complex event to an application server 460 for further processing. Alternately the application server 460 can probe the RFID data store for events of interest to operate on.

The rules in the RFID rules database 440 are derived from an RFID application. A typical RFID application is concerned with detecting complex events and triggering actions based on the occurrence of those complex events. These complex events and related actions can be combined into a declarative rule or rule construct by using a declarative event language. The building blocks of the declarative rules are complex events and complex event constructors. Typical RFID event processing systems support only non-temporal event constructors, such as, for example, logical OR ($\vee$), logical AND ($\wedge$), and logical negation ($\neg$). An exemplary embodiment of the present invention additionally provides the following temporal event constructors using declarative constructs.

A SEQ( ) constructor is used to represent a sequence of events. SEQ(E1;E2) is an embodiment of the SEQ( ) constructor which represents the sequence of two events, namely E1 followed by E2.

A TSEQ( ) constructor is used to represent a time distance constrained sequence of events. TSEQ(E1;E2,t1,t2) is an embodiment of the TSEQ( ) constructor which represents the sequence of two events E1 and E2, where E2 follows E1, and the temporal distance between occurrences of E1 and E2 is the absolute value of (t2−t1).

A SEQ$^+$( ) constructor is used to represent an aperiodic sequence of events. SEQ$^+$(E1) is an embodiment of the SEQ$^+$( ) constructor which represents an aperiodic sequence of E1 events.

A TSEQ$^+$( ) constructor is used to represent a time distance constrained aperiodic sequence of events. TSEQ$^+$(E1,t1,t2) is an embodiment of the TSEQ$^+$( ) constructor which represents one or more occurrences of event E1 such that the temporal distance between two adjacent occurrences is the absolute value of (t2−t1).

A WITHIN( ) constructor is used to represent an interval constrained event. WITHIN(E1,t1) is an embodiment of the WITHIN( ) constructor which represents and event E1 occurring within a period of time t1.

The rules in RFID rules database include a rule id, an event, and one or more actions. The event is constructed using selected combinations of the above non-temporal and temporal event constructors, and primitive events. When the event occurs, the one or more actions is/are triggered. The RFID rules may also include a rule name so they can be more easily identified. Additionally, the RFID rule may include a logical condition which has to be satisfied first before an occurrence of the event will trigger the rules actions. An example of an event of an RFID rule formed from the earlier defined event constructors is SEQ(WITHIN(E1$\wedge$E2,5s), E3), which defines a complex event which occurs when E3 occurs after events E1 and E2 occur within 5 seconds of one another.

An exemplary embodiment of the syntax for the RFID rule is illustrated in FIG. 5a. The rule_id and rule_name stand for the unique id and name of the rule. The event part of the rule is the event part of the rule. The condition may be a Boolean combination of user-defined Boolean functions and/or SQL queries. The action is an ordered list of actions where each action may be a SQL statement or a user-defined procedure The syntax for the RFID rule illustrated is merely an exemplary embodiment. The ordering of the fields may vary considerably, and certain fields may not be present. As an example, if the condition is not present, the actions of the rule always trigger when the event occurs.

An RFID application can be mapped into RFID rules for filtering of primitive events and processing and detection of complex events. Filtering includes low level data filtering and semantic data filtering. The low level data filtering cleans raw RFID data and semantic data filtering extracts data on demand. Low level data filtering includes detection and removal of duplicate events. Receipt of duplicate RFID events are common in RFID observations. The duplicates can be caused for several reasons including: (1) tags being in the scope of a reader for a long time (in multiple reading frames) are read by the reader multiple times; (2) multiple readers are installed to cover a larger area or distance, and tags in the multiple areas are read by multiple readers; and (3) to enhance reading accuracy, multiple tags with the same EPCs are attached to the same object, thus generating duplicate readings. Duplicate RFID events can be filtered out by applying a duplicate rule to the received RFID events. As an example, the duplicate rule could be as follows: if we receive 2 observations within five seconds from the same reader on the same tagged object, throw away the first observation. FIG. 5b illustrates a duplicate RFID rule, according to an exemplary embodiment of the present invention. In this example, since the condition is set to true, a duplicate message for E1 will be sent if E2 is received within 5 seconds of E1.

An example of semantic data filtering occurs in a smart shelf application that is only concerned with the removal of an object from a shelf. While a reader on the shelf may be periodically reporting the presence of the object to the application, the application is only concerned with the last observation which indicates the object is no longer present on the shelf. All the prior observations can be disregarded or filtered out by use of a semantic data filtering rule. As an example, the semantic data filtering rule could be as follows: if we have observed the object and thirty seconds have passed without another observation of the s object, send a notification to the application. An exemplary embodiment of an RFID rule for this type of semantic data filtering is illustrated in FIG. 5c.

RFID rules can also be created for data transformation, data aggregation, and real time monitoring. FIG. 5d illustrates an RFID rule for location transformation, according to an exemplary embodiment of the present invention, FIG. 5e illustrates an RFID rule for data aggregation, according to an exemplary embodiment of the present invention, and FIG. 5f illustrates an RFID rule for real time monitoring, according to an exemplary embodiment of the present invention.

Figure 6A:
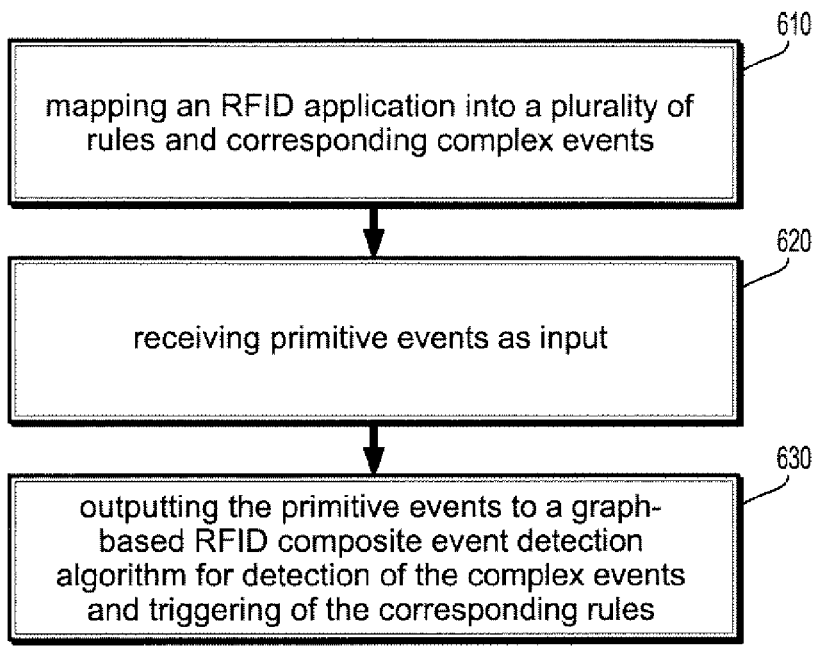
FIG. 6a illustrates a method of processing an RFID application, according to an exemplary embodiment of the present invention.

FIG. 6a is a high-level flow chart of a method for processing an RFID application, according to an exemplary embodiment of the present invention. Referring to FIG. 6a, the method comprises the steps of mapping the RFID application into a plurality of rules and corresponding complex events 610, receiving primitive events as input 620, and outputting the primitive events to a graph-based RFID composite event detection algorithm for detection of the complex events and triggering of the corresponding rules 630.

Figure 6B:
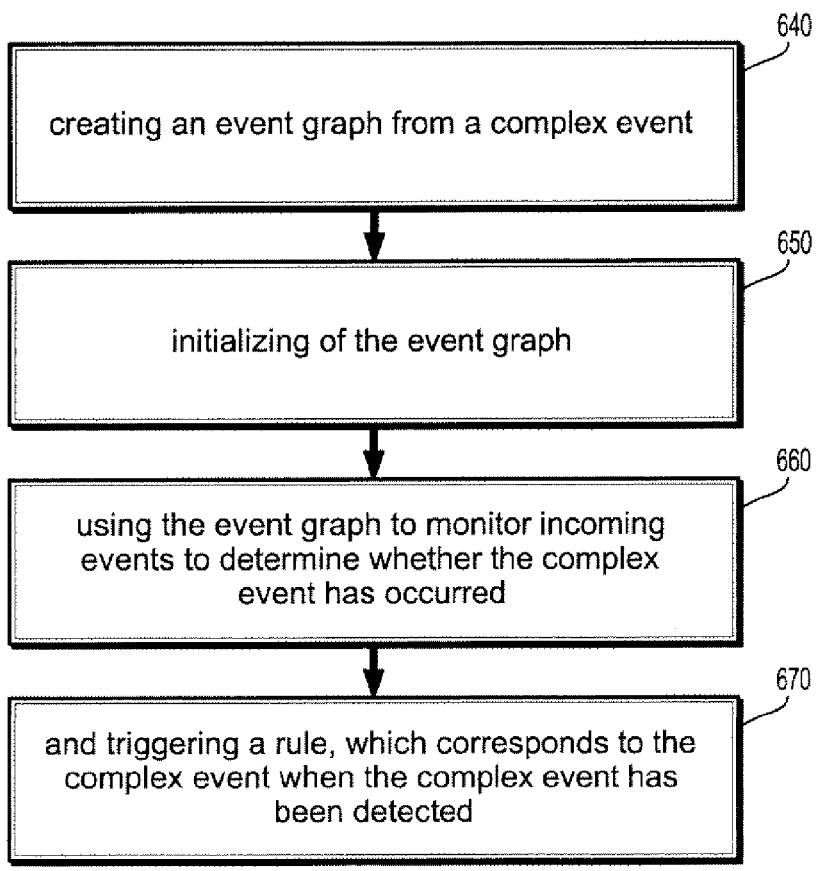
FIG. 6b illustrates an graph-based RFID composite event detection algorithm used in FIG. 6a, according to an exemplary embodiment of the present invention.

A high-level flow chart of the graph-based RFID composite detection algorithm of FIG. 6a is illustrated in FIG. 6b, according to an exemplary embodiment of the present invention. FIG. 7 illustrates pseudo code for the algorithm illustrated in FIG. 6a, according to an exemplary embodiment of the present invention. Referring to FIG. 6b, the algorithm comprises the steps of creating an event graph from a complex event 640, initializing of the event graph 650, using the event graph to monitor incoming events to determine whether the complex event has occurred 660, and triggering a rule, which corresponds to the complex event when the complex event has been detected 670.

The step of using the event graph to monitor incoming events to determine whether the complex event has occurred of FIG. 6b may include the following additional steps: (1) upon receiving one of the incoming events, activating parent nodes of the event graph recursively if the incoming event is one of the primitive events, and generating a pseudo event if one of the pseudo event generation flags of a corresponding one of the parent nodes is true, and (2) upon receiving the pseudo event, checking to determine whether there are any instances of a target event of the pseudo event has occurred during an interval constraint of the target event, and recursively activating parent nodes of the event graph for each of the instances.

Figure 8A:
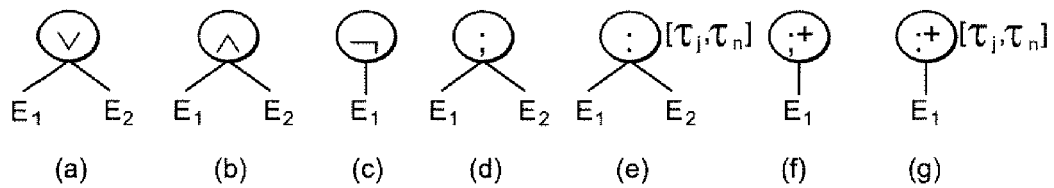
FIG. 8a-b illustrate graphical representations of composite/complex temporal event constructors, according to an exemplary embodiment of the present invention.
Figure 8B:
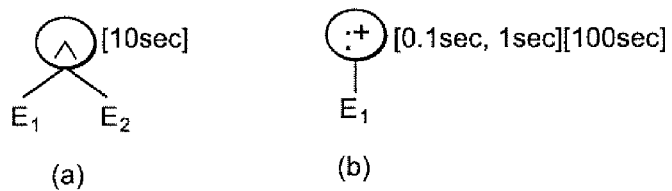
Figure 8C:
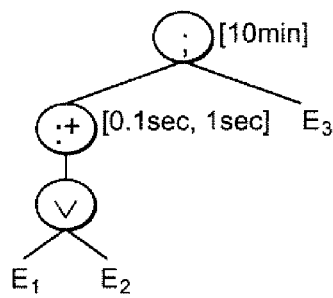
FIGS. 8c-8d illustrates initialization steps of the method illustrated in FIG. 6b, according to an exemplary embodiment of the present invention.

FIG. 8a illustrates exemplary graphical representations of composite event constructors, which may be used to construct the event graph referenced in FIG. 6b and FIG. 7. Referring to FIG. 8a, the graphical representations labeled 'a', and 'b' represent the logical OR and logical AND of two events, respectively. The graphical representations labeled 'c' represents a negative event. The graphical representations labeled 'd' and 'e' represent the temporal event constructors SEQ( ) and TSEQ( ), respectively. The graphical representations labeled 'f' and 'g' represent the temporal event constructors SEQ$^+$( ) and TSEQ$^+$( ), respectively. FIG. 8b illustrates exemplary graphical representations using the WITHIN( ) temporal event constructor. Referring to FIG. 8b, the graphical representation labeled 'a' represents the logical AND of two events that occur within ten seconds of one another. As illustrated in FIGS. 8a and 8b, constituent events are represented as leaves and the constructed events are represented as parent nodes.

The event graph can be constructed by building an event tree $T_i$ with leaf nodes representing primitive events, internal nodes representing composite events and edges linking from constituent events to composite events. The root node of $T_i$ represents the event part of an RFID rule.

Figure 8D:
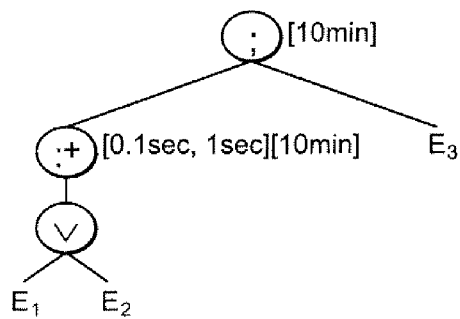

Once the event graph is constructed, the graph may be initialized as shown by lines 2-6 of FIG. 7. If there is an interval constraint defined on an event node VE∈$T_i$, VE'S interval constraint is propagated to all the descendant nodes of VE. This is because a composite event always has a longer interval than its constituent events. Interval constraints are propagated top-down in the event tree. Given an event node VE, its interval constraint is set to be the minimum of the current interval constraint of event E (if any) and that of its parent event node, if any. The complexity of this algorithm is $O(|T_i|)$, where $|T_i|$ represents the size of the event tree $T_i$. For example, FIG. 8d illustrates the graphical representation of a composite event E=WITHIN(TSEQ$^+$(E1∨E2, 0.1 sec, 1 sec); E3, 10 min) after interval propagating from FIG. 8c. FIG. 9 illustrates an embodiment of pseudo code for propagating the interval constraints in an the event tree $T_i$.

Once the interval constraints have been propagated, FIG. 7 illustrates that event detection modes are assigned to each node in the event graph. Traditional graph-based event processing systems detect composite events in a bottom-up fashion. Occurrences of primitive events are injected at the leaves and flow upwards triggering composite events. Such a bottom-up event detection paradigm, however, is inapplicable to detecting RFID events. In fact, many RFID events (such as those generated from SEQ+( ) constructors) are non-spontaneous. They cannot detect their occurrences by themselves unless they either get expired if they are associated with interval constraints or are explicitly queried about their occurrences from their parent nodes.

Next, we generalize three RFID event detection modes for each node VE in the event graph.

An event node VE's detection mode is push if E is a spontaneous event such that whenever instances of E occur, VE automatically detects the occurrences and propagates them to its parent. For example, primitive events can always automatically propagate their instances to their parents, thus always have push mode.

An event node VE's detection mode is pull if E is a non-spontaneous event such that VE cannot determine whether instances of event E has occurred or not unless being explicitly queried by VE'S parent node. For example, the detection mode for a NOT event is always pull.

An event node VE's detection mode is mixed if its detection mode is neither a simply push neither a simply pull. Instead, the event node is queried about its occurrence when it gets expired. Such event nodes are usually associated with temporal constraints. For example, the detection mode for a composite event E=TSEQ$^+$(E1, t1, t2) is mixed if E1 is a spontaneous event. When an instance of E1 arrives at time timestamp, VE cannot determine whether the sequence has ended or not unless there is no arrival of other instance of E1 during the period of [timestamp, timestamp+T2].

We can compute the event detection modes for the nodes in an event graph recursively starting from primitive event nodes on the leaf level. While the detection mode for a primitive event node is always push, the detection mode for a composite event depends on the event constructor type and the modes of its constituent sub-events.

FIG. 7 illustrates that after detection modes have been assigned to nodes of the event graph, pseudo events flags and target events for each node in the event graph are assigned. Existence of non-spontaneous RFID events cause mixed detection mode. Mixed mode RFID event nodes cannot be supported in traditional graph-based event detection systems, which propagate event occurrences from bottom up. Pseudo events are generated when necessary to trigger explicit queries about the occurrences of these non-spontaneous events (i.e., in a top-down way).

A pseudo event is a special artificial event used for querying the occurrences of non-spontaneous events during a specific period, and is scheduled to happen at an event node's expiration time. We represent a pseudo event instance as $e'^{[tc, te]}_i$ with its target event id i, creation time $t_c$ and execution time $t_e$. A pseudo event $e'^{[tc, te]}_i$ is to query the occurrences of event i during the period [tc, te], or non-occurrences of event i during the period [tc, te] if the constructor for event i is NOT.

For an RFID rule r with a push mode event r. E, there is no need to generate pseudo events even though r.E contains non-spontaneous sub-events. For example, suppose that r.E=WITHIN($\neg$E1; E2,t) where E1 and E2 are primitive events, any occurrence of E2, e.g., e2, will trigger the querying about the non-occurrences of E1 during the period [t_end(e2)−t, t_end(e2)]. Thus, there is no need to generate pseudo events in this case.

For a mixed mode event r. E, however, we need to generate pseudo events to trigger the querying about the occurrences of non-spontaneous sub-events. For example, for an interval-constrained composite event E=WITHIN(E1 ∧ ¬E2, t) where E1 and E2 are primitive events; if E1 happens first, we need to make sure that there is no occurrence of E2 within t. Therefore, if there is no occurrence of E2 during the interval of E1's instance, occurrence of an E1 instance e1 will create a pseudo event with the target event ¬E2, creation time t_end(e1) and execution time t_begin(e1)+t), which is to query about the non-occurrence of event E2 during the period [t_end(e1), t_begin(e1)+t]. FIG. 10 illustrates pseudo code for a method of assigning event flags to nodes of an event graph, according to an exemplary embodiment of the present invention.

Figure 11:
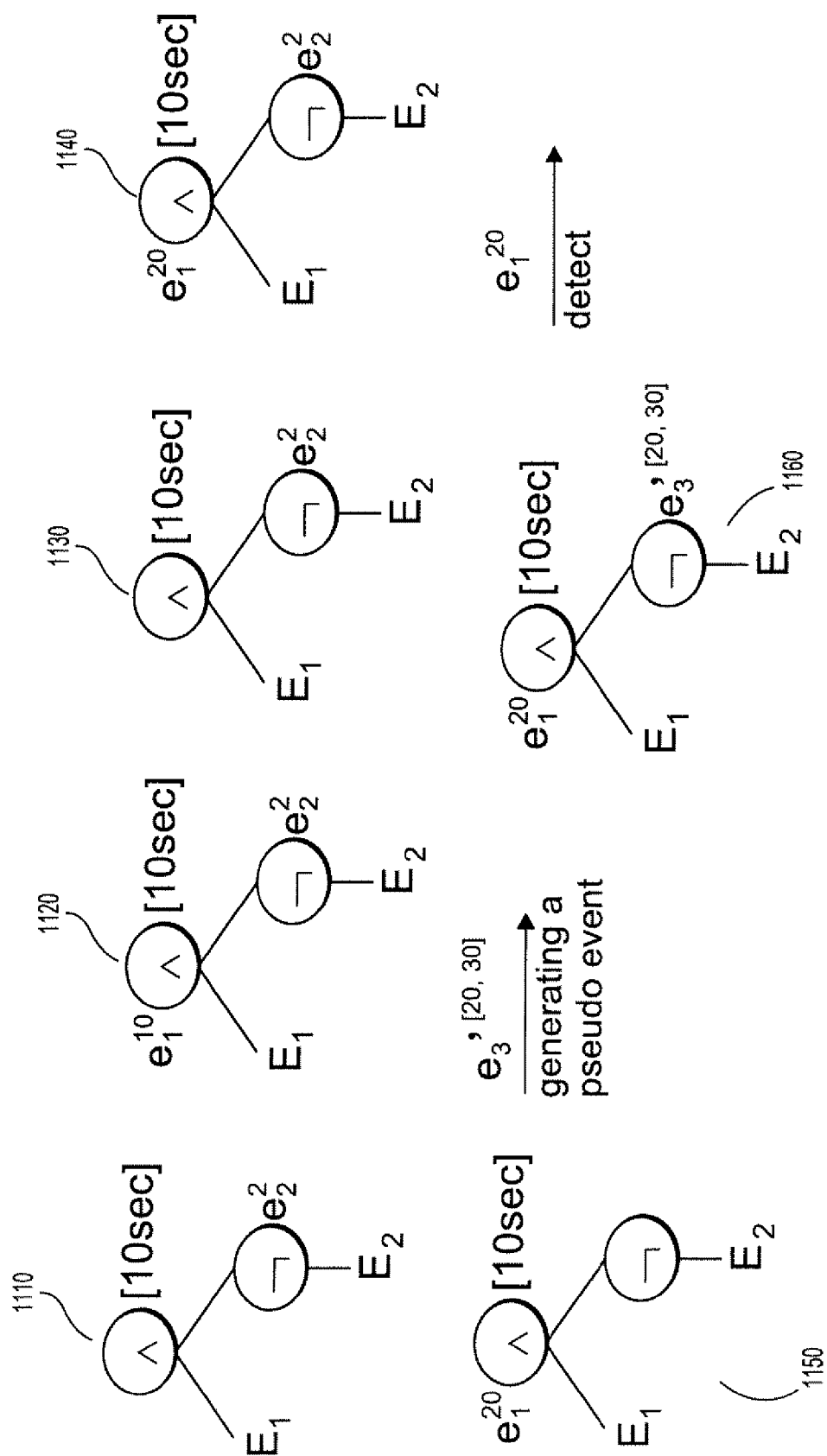
FIG. 11 illustrates using pseudo events to detect complex events, according to an exemplary embodiment of the present invention.

FIG. 11 illustrates an example of detecting composite events using pseudo events, according to an exemplary embodiment of the present invention. Referring to FIG. 11, on arrival of $e_2^2$, $VE_2$ propagates $e_2^2$ to its parent node. Since the parent node is non-spontaneous, it will not further propagate the occurrence 1110. On the arrival of $e_1^{10}$, $VE_1$ propagates its occurrence to VE, which triggers the querying about the non-occurrence of $E_2$ during the period of [t_end($e_1^{10}$)−10 sec, t_end(($e_1^{10}$)], i.e., [0 sec, 1-sec] 1120. Since there is an occurrence $e_2^2$ of $E_2$ during the period of [0 sec, 10 sec] $e_1^{10}$ cannot be a constituent instance of E's occurrence. Thus, $e_1^{10}$ is deleted 1130. Similarly, on the arrival of $e_1^{20}$, $VE_1$ propagates its occurrence to VE, which triggers the querying about the non-occurrence of $E_2$ during the period [t_end($e_1^{20}$)−10 sec, t_end($e_1^{20}$)], i.e., [10 sec, 20 sec] 1140. Since there is no occurrence of $E_2$, VE cannot detect its occurrence unless there is no occurrence of $E_2$ during the period [t_end($e_1^{20}$), t_begin ($e_1^{20}$)+10 sec]), i.e., [20 sec, 30 sec] 1150. Thus, a pseudo event is scheduled to be generated at time 30 sec to query the event node $\vee \neg E_2$, represented as $e_3'^{[20,30]}$. The arrival of $e_3'^{[20,30]}$ will trigger the querying about the non-occurrence of event $E_2$ during the period [20 sec, 30 sec] 1160. Since there is no occurrence of $E_2$ during that period, an occurrence of E is detected.

Once an event of an RFID application is detected, the event is typically stored as RFID raw data in a database. Using a generic data model can bridge the gap between RFID raw data and business applications, thereby minimizing integration efforts. A typical data model provides static entities and relationships. However, due to the temporal nature of RFID data, most relationships in RFID applications are dynamic and history oriented. The generic data model additionally includes temporal relationships and nested relationships.

There are two types of temporal relationships among RFID entities: relationships that generate events and relationships that generate state histories. An example of a nested relationship is an application with sensor-write tags, where an onboard sensor records the temperature measurement history in the tag. Thus, a reader observation contains both the EPC of the tag and the measurement history. The observation relation includes a nested relation, the sensor measurement history.

The tables that are chosen for an specific embodiment of the generic data model are specific to the needs of the RFID application. The generic data model may include static entity tables, static relationship tables and temporal relationship tables and nested relationship tables.

An embodiment of the generic data model for an RFID application which uses a fixed reader and read only tags may include a number of static entity tables, static relationship tables, and temporal relationship tables. These static entity tables may include a READER, OBJECT, LOCATION, and TRANSACTION table. The READER table may record the EPC, the name, and the description of a reader. The OBJECT table may record the EPC, the name and the description of a tagged object. The location table may record symbolic locations used for tracking, including an id, name, and owner of a location. The TRANSACTION table may include a transaction id and a transaction type.

The static relationship tables of an RFID application which uses a fixed reader and read only tags may include a READERLOCATION table and a LOCATIONCONTAINMENT table. The READERLOCATION table may keep the location of a fixed reader including the EPC of a reader, and a location id. The LOCATIONCONTAINMENT table may record the containment relationship among locations. For example, a warehouse may contain a loading zone and a departure exit.

The temporal relationship tables of an RFID application which uses a fixed reader and read only tags may include an OBSERVATION table, a CONTAINMENT table, and an OBJECTLOCATION table. The OBSERVATION table may record raw reading data generated by readers, including a reader's EPC, a tag's EPC value, and the reading timestamp. The CONTAINMENT table may record in what period [tstart,tend] an object (identified by its EPC) is contained in its parent object (identified by EPC of its parent). The OBJECTLOCATION table may preserve the location history of each object, including an object's EPC, location id, and the period [tstart, tend] during when the object stays in that location.

In many RFID applications, readers are movable with different location semantics. Location information may however be unimportant. For example, a nurse may use a movable reader to identify a patient and then retrieve the patient's medical history. An embodiment of the generic model for this example is similar to the RFID application described above which uses a fixed reader and read only tags, except it need not include location entity and location-related relationships embodied by the READERLOCATION, OBJECTLOCATION, and LOCATION containment tables.

An RFID application with a movable reader with discrete locations and read-only tags is also similar to the RFID application which uses a fixed reader and read only tags. However, readers' locations are temporal and locations are identified by tag EPCs. The READERLOCATION table may be replaced with a t-readerlocation table which records in what period [tstart, tend], a reader, identified by its EPC, is at a specific location represented by its location id. The LOCATION table may be replaced with an E-LOCATION table which is similar to the location table but additionally records the EPC from the tag used to identify a tagged location.

An RFID application with a reader which is movable and locations which can be identified by a location sensor (e.g., GPS) may include a LOCATIONSENSOR table as an additional static entity table and a C-OBSERVATION table as a temporal relationship table. The C-OBSERVATION table is generated by combining the interaction among the READER, OBJECT, and LOCATIONSENSOR tables. The C-OBSERVATION TABLE may capture the observation of an object (identified by the object's EPC) by a reader (identified by its EPC) at a physical location (x,y,z) provided by a location sensor at time timestamp.

An RFID application where an operator walks around with a hand-held reader may include an OPERATOR table as a static entity table, an altered OBJECT table, and an OPERATION table as a temporal relationship table. The OPERATOR table may describe the operator with an id, name, description, as well as the EPC of the reader the operator wears. In this situation, the OBJECT table may record the object being operated, such as its EPC, name and description. The OPERATION table may record the operations performed by an operator with the operator's id, observed object EPC, and the lifespan [tstart,tend] of the operation.

In read-write RFID applications, besides reading of tags, there is also the writing to tags. Writings can be performed by a reader on class 2 tags or performed by onboard sensors on class 3 tags.

In an RFID application in which readers are mounted at fixed locations and tags are of class 2, properties for objects, such as "processing steps" may be predefined. Property values are written through a writer as timestamped values. When a reader observes a tag, it reads not only the tag ID, but also a history of the object property values. Thus an observation forms a nested relation. An embodiment of the generic RFID data model for this application may include an OBJECT-PROPERTY table as a static relationship table and an N-V-OBSERVATION/N-PROPERTYVALUE as a nested table.

The OBJECTPROPERTY table may describe the properties defined for an object, including the object's EPC, property id and name. The n-v-observation/n-propertyvalue table is a nested relation that may represent the observation of a tag, including the reader EPC, the object EPC, and observation timestamp, together with the nested history of property values written by writers. While nested relations are supported in some databases, this relation can be flattened into two separate tables such as a V-OBSERVATION table and a PROPERTYVALUE table. The V-OBSERVATION table may represent reader observations, where vo_id is the unique id for each observation This unique id forms the foreign key linking the table to the PROPERTYVALUE table. The PROPERTYVALUE table may represent the history of property values having a parent key vo_id, a property id, a value, and an id of the writer that writes the value and the timestamp when the writing occurs.

In an RFID application with a fixed reader and sensor-write tags, writing is performed by onboard sensors. Sensors detect targets independent of readers and periodically write sensor measurements to tags. When a reader interacts with an object, the reader observes both the id and the logged sensor measurement. An embodiment of the generic RFID data model for this application may include an OBJECTSENSOR table as a static relationship table and an n-s-observation/n-sensormeasurement table as a nested table.

The OBJECTSENSOR table may describe the information about a sensor, including the EPC of the object containing the sensor, sensor ID, name, type, description, and measurement unit. The n-s-observation/n-sensormeasurement table is nested relation which may represent the observation of a tag, including the reader EPC, the object EPC, and observation timestamp, together with the nested history of sensor measurements written by sensors. This nested relation can be flattened into two separate tables such as an S-OBSERVATION table and an SENSORMEASUREMENT table.

The S-OBSERVATION table may represent reader observations, where so_id is the unique ID for each observation. The unique ID forms the foreign key linking the table to the SENSORMEASUREMENT table. The SENSORMEASUREMENT table may preserve the history of sensor measurements including the parent so_id, sensor_id, the target (e.g., temperature), value, and the sensing timestamp.

Figure 12:
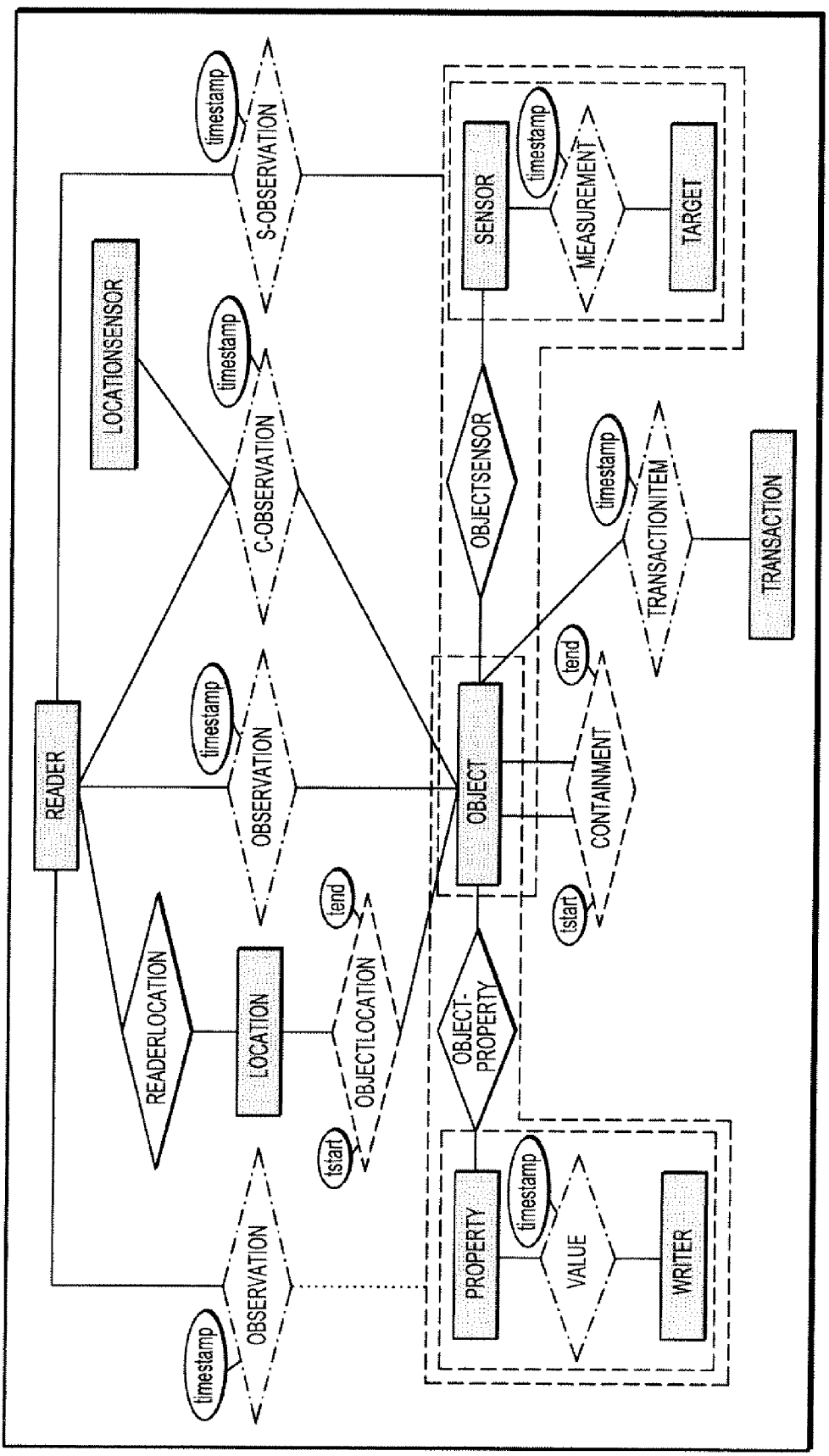
FIG. 12 illustrates an exemplary embodiment of a generic RFID data model according to an exemplary embodiment of the present invention.

An exemplary embodiment of the generic data model for an RFID-enabled supply chain is illustrated in FIG. 12, according to an exemplary embodiment of the present invention. Referring to FIG. 12, the left bottom polygon block represents an aggregation of reader-write property values from a production line, and V-OBSERVATION is the corresponding observation of tagged objects moving through the supply line. The right bottom polygon represents the aggregation of sensor-write measurements in a truck that is loaded with tagged objects, and S-OBSERVATION is the corresponding observation of the tags. C-OBSERVATION is the observation of the truck and its location from the GPS-combined reader. OBJECTLOCATION is the location history of tagged objects (e.g., items, cases, and pallets).

In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A Radio Frequency Identification (RFID) events processing system comprising:

a host computer configured to receive primitive RFID events output by at least one RFID reader, the least one RFID reader generating the primitive RFID events in response to data from at least one RFID tag, wherein the host computer comprises:

a rules database having filtering rules for discarding some of the detected primitive RFID events and complex event rules, the complex event rules including rules having an action and at least one of (i) a sequence of primitive RFID events, (ii) a sequence of primitive RFID events and a time period in which the sequence occurs, or (iii) a logical condition for a plurality of RFID events and a time period in which logical condition occurs;

a primitive event filtering unit for discarding some of the detected primitive RFID events based on the filtering rules to generate filtered RFID events; and a complex event detection engine which detects complex RFID events from the filtered RFID events based on the complex event rules to perform the associated action.

2. The RFID events processing system of claim 1, further comprising an event database for storing the primitive RFID events that correspond to the complex event rules as complex RFID events.

3. The RFID event processing system of claim 2, further comprising an application server which retrieves the complex RFID events from the event database for processing.

4. A method for processing a radio frequency identification (RFID) application, the method comprising:
- mapping the RFID application into a plurality of complex rules each complex rule specifying an action, a set of primitive RFID events, and at least one condition related to the set that needs to be satisfied before the action can be performed;
- generating an event graph for each complex rule, where the primitive RFID events are leaves of the graph and the conditions are parent nodes of the graph; and
- monitoring the incoming primitive RFID events using the event graphs to determine whether the conditions of a complex rule have been satisfied to perform the associated action,
- wherein the method is performed by a processor.

5. The method of claim 4, wherein generating the event graph further comprises:
- propagating time interval constraints of the complex rule to the event graph in a top-down fashion;
- assigning event detection modes to nodes of the event graph in a bottom-up fashion based on event constructors of the complex rule and the interval constraints; and
- assigning pseudo event generation flags and target events to the nodes in a top-down based on the event detection modes.

6. The method of claim 4, wherein the using of the event graph comprises:
- upon receiving one of the incoming primitive RFID events,
  - activating parent nodes of the event graph recursively if the incoming primitive event is one of the primitive events of the event graph;
  - generating a pseudo event, if one of the pseudo event generation flags of a corresponding one of the parent nodes is true; and
- upon receiving the pseudo event,
  - checking to determine whether an instance of a target event of the pseudo event has occurred during an interval constraint of the target event, and recursively activating parent nodes of the event graph for each of the instances.

7. The method of claim 4, wherein the rules include data filtering rules, data transformation rules, or monitoring rules.

8. The method of claim 7, wherein the data filtering rules include at least one of low level data filtering rules or semantic data filtering rules.

9. The method of claim 5, wherein the event constructors include at least one of temporal or non-temporal event constructors, the temporal constructors specifying a time period in which a plurality of primitive RFID events is to occur.

10. A computer-readable medium readable by computer tangibly embodying a program of instructions executable by a processor to perform method steps for processing aria radio frequency identification (RFID) application, the method steps comprising:
- mapping the RFID application into a plurality of complex rules each complex rule specifying an action, a set of primitive RFID events, and at least one condition related to the set that needs to be satisfied before the action can be performed;
- generating an event graph for each complex rule, where the primitive RFID events are leaves of the graph and the conditions are parent nodes of the graph; and
- monitoring the incoming primitive RFID events using the event graphs to determine whether the conditions of a complex rule have been satisfied to perform the associated action.

11. A host computer configured to detect and process RFID events comprising:
- an event queue for receiving and storing incoming primitive RFID events; a database for storing a plurality of rule constructs, wherein each rule construct includes a rule id identifying the rule, at least one primitive RFID event, a condition related to the at least one primitive RFID event, and an action performed when the condition is satisfied;
- a processor unit processing the incoming RFID events from the event queue using the rule constructs to trigger an action associated with the rule constructs when the associated condition is satisfied.

12. The host computer of claim 11, wherein the condition is a temporal constraint that the at least one primitive RFID events occur within a predefined time period of one another.

* * * * *